UNITED STATES PATENT OFFICE.

JOHN R. YOUNG, OF NORFOLK, VIRGINIA.

PROCESS OF MAKING COMPLETE FERTILIZERS.

No. 911,283.    Specification of Letters Patent.    Patented Feb. 2, 1909.

Application filed September 3, 1908. Serial No. 451,568.

*To all whom it may concern:*

Be it known that I, JOHN R. YOUNG, a citizen of the United States, residing at Norfolk, in the county of Norfolk and State of Virginia, have invented a certain new and useful Fertilizer Compound and Process of Making Same, of which the following is a specification.

My invention relates to the manufacture of an improved fertilizer in which nitrogenous organic matter, such as refuse or waste matters of the packing house, fisheries or other industries, suitable for use as ammoniates (as such term is universally understood by the fertilizer trade), and vegetable matters such as hereinafter described, are employed as sources of ammonia and potash and combined with tri-calcium phosphate generally termed by the fertilizer trade " bone phosphate of lime " and sulfuric acid; and the object of my invention is to produce in a single mixing operation, a complete or special fertilizer containing all the essential principles, or elements, required in plant growth, so proportioned and combined as to meet the requirements of the particular crop, or crops, for which the fertilizer may be intended, or to serve as a convenient base for producing special fertilizers, as hereinafter explained.

In my U. S. Letters Patent, No. 897,695, issued September 1st 1908, I have described and claimed a process of producing fertilizer, wherein I employ, chiefly as ammoniates, refuse or waste material of the packing house, fisheries, or other industries (particularly tankage, fish scrap, or fish chum), in the crude state as it comes from the press, and with its contained moisture (40 to 50% by weight) convert it into good physical and merchantable condition without the use of absorbents or the application of artificial heat, or other special drying process which tends to drive off its effective fertilizing principle, whereby I am enabled to effect a large saving in ammonia with corresponding increase in market value of the material, and a reduction in the cost of production; and wherein I also utilize this crude material as a vehicle for the water required in chemical action due to compounding therewith bone phosphate of lime and sulfuric acid, such compounding being effected in such proportions and under such conditions that the moisture of the crude ammoniate is assimilated in the compound to such a degree that the mass, after being allowed to set a suitable time, has acquired the requisite physical condition for sale and use.

In carrying out my present invention, I employ vegetable matter as a source of potash, principally the refuse or waste material of tobacco stemmeries known as " ground tobacco stems ", and, also, the refuse of the sugar-beet industry known as " potash manure ", and incorporate this vegetable matter, in the ammoniated super-phosphate described in my aforesaid Letters Patent, by subjecting the combined ingredients, to wit: the potash-containing vegetable matter, the crude ammoniate, and the bone phosphate of lime, simultaneously, to the action of the sulfuric acid, thus producing in a single mixing operation a complete fertilizer containing all the essential elements necessary to the perfect development of plant growth, to wit: ammonia, phosphoric acid and potash, in the most available form, and in proper condition for immediate use.

The following explanation is important to a full and clear understanding of my invention and the process employed therein: Artificial fertilizers may be divided into two classes—" wet mixtures " and " dry mixtures ": The former consist, principally, of ammoniated super-phosphates and acid phosphate, containing ammonia and phosphoric acid only; the latter includes nearly all mixed fertilizers, or those containing the three important elements of plant food, viz., ammonia, phosphoric acid and potash, and termed " complete fertilizers ". The " wet process " is one in which each ingredient of the compound is decomposed by the same reagent, the water required in the reaction being supplied either with the acid (as reduced or diluted acid) or added separately. The product of the reaction is a uniform and homogeneous substance containing the combined properties of indistinguishable ingredients, and is termed a " chemical compound ". The "dry method" consists in merely mixing the several ingredients of the fertilizer without the presence of a decomposing agent, whereby no chemical change is effected, each ingredient retaining in the resulting "mechanical mixture" its original condition and character.

Heretofore it has been considered unprofitable—if not impracticable—to produce by wet process—in one operation—a complete or standard fertilizer of analysis conforming to trade usage, or custom, as many materials employed in "making analysis"—and potash salts especially—can not be successfully used in wet mixture. For this reason, in particular, "complete fertilizers" are almost invariably prepared by the dry method, which involves several operations: First, said phosphate is made (by wet process) and with this material nitrogenous matters, fish, tankage, blood, etc.—are usually mixed, forming a "base"; then is added potash and ammonia salts, or other material to give the required analysis. All this not only adds largely to the cost, but the finished article, being of a mechanical nature, is more or less un-uniform both in composition and quality.

My object is to overcome these objectionable features by employing material containing potash, especially, in a suitable form for wet mixing, and combine this material, the crude-ammoniate and the bone phosphate of lime, by treating the "mixture" with sulfuric acid, and thereby produce by chemical action in one mixing operation a complete and perfect fertilizer containing all the valuable fertilizing properties of the several ingredients inseparably united in one uniform and homogeneous substance of required analysis suiting the purpose for which the fertilizer is intended.

This object I accomplish by employing vegetable matter, in which is contained potash in the most desirable form—as fitted or prepared by nature for the perfect development of vegetation or plant growth, and free from the objectionable properties common to salts which often prove injurious to vegetation. Besides potash, vegetable matter usually contains ammonia, or nitrogen, which is also in the most desirable form for plant growth.

While not limiting myself to specific sources of potash, vegetable matters to which preference is given may be thus described: Ground tobacco stems—or refuse of "tobacco stemmeries" after the tobacco is stripped—is in the form of a fine dry powder, and contains usually from 6 to 12 per cent. actual potash and from 2 to 4 per cent. ammonia (or equivalent nitrogen). Potash manure—refuse of the "sugar-beet industry"—is also in the form of a powder, and is usually imported from Europe. It contains, generally, from 7 to 11 per cent. actual potash and from 4 to 7 per cent. ammonia (as nitrogen).

Whereas it was heretofore impracticable to embody the potash (as a salt) in the wet processes, because of its too ready solubility and loss, when employed according to my present invention in wet mixture with an ammoniate such as undried press-cake of fish or tankage, and with bone phosphate, the potash-containing vegetable matter responds favorably to treatment with sulfuric acid, and without loss, because the wet ammoniate supplies sufficient moisture to prevent carbonization of the organic matter, yet not sufficient to carry off the potash.

The "ground tobacco stems" and "potash manure", in particular, I employ either singly or in combination. As each material has its own characteristic, or distinctive properties—one containing, in a measure, what the other lacks—I find, in practice, that more satisfactory results are secured by using the two articles in combination—in about equal parts—than when they are employed separately.

While not limiting myself to any particular nitrogenous organic matter, or "ammoniate" as this element is termed by the fertilizer trade, this ingredient of my compound may be fairly illustrated by the following: "Fish scrap" and "fish chum" as already pointed out in my previous patent, are terms applied to the residue of fish after being cooked and having the oil extracted and the water pressed out. This material is a by-product chiefly of the menhaden fisheries industry and is largely employed as an ammoniate in the manufacture of artificial fertilizers. In the crude state, as it comes from the press, it is generally known as "fish chum", in which state it usually contains from 40 to 50 per cent. moisture, from 5 to 8 per cent. ammonia (or equivalent nitrogen) and 4 to 6 per cent. phosphoric acid, part of which is already available.

Tankage is the sediment, or residue, of refuse material of the packing-house, or other industries, remaining in the rendering tank after the oil and grease have been extracted therefrom and the tank water drawn off. After the material has been subjected to pressure, in order to expel as much water as possible, the residue—or "press-cake", as it is termed—is crushed, or broken up, then passed to the drier, from which it emerges as "dried tankage". In condition as it comes from the press, the crude press-cake usually contains 40 to 50 per cent. moisture and varying percentages of ammonia (as nitrogen) and bone phosphate, according to the nature of the material from which it is obtained.

Bone phosphate of lime may be obtained from any material containing sufficient phosphate of lime, preference, however, being given to phosphate rock, or animal bone in any of its forms, as raw or steamed bone, tankage, bone-black, etc. It is important that the material supplying bone phosphate should be dry and finely pulverized. Sulfuric acid should be full strength—preferably 66° Baumé.

As different materials vary in per cent. of ammonia, bone phosphate and potash contained, the proportions of the several ingredients of the compound may be varied to suit the strength of the material employed and the per cent. of ammonia, phosphoric acid and potash desired in the finished article. For example: It is desired to make what are known as 2—8—2 goods, or a fertilizer containing 2 per cent. ammonia, 8 per cent. available phosphoric acid and 2 per cent. potash. For one ton of mixture, I may take: 550 lbs. crude fish (plain or acidulated) containing 5 to 6 per cent. ammonia, 4 to 5 per cent. available phosphoric acid and 50 per cent. moisture. 500 lbs. tobacco stems and potash manure in about equal parts, the combination averaging 3 per cent. ammonia and 8% potash. 500 lbs. phosphate rock of about 60% strength in bone phosphate. 450 lbs. sulfuric acid—about 66° Baumé. Or, should 3—8—3 goods be desired, the following formula would give the required analysis for a ton of mixed goods: 600 lbs. crude fish (either form) containing about 7% ammonia, 4 to 5% available phosphoric acid and 40% moisture. 400 lbs. phosphate rock—68 to 70% bone phosphate of lime. 600 lbs. tobacco stems containing about 3% ammonia and 10% potash. 400 lbs. sulfuric acid—about 66° test, 2000 lbs. This combination, having potash derived solely from tobacco, and, hence, in nature's form, proves an ideal fertilizer for this crop, in particular.

The two above cases are given merely as illustrating the invention and the invention is not limited to the specific substances or proportions.

By mixing potash and ammonia salts, or other material, with the compound (2—8—2, 3—8—3, or other combination, as herein described) special fertilizers of higher grade, (adapted to truck crops in particular) may be obtained.

In carrying out the invention, I employ the crude, or undried, ammoniate in condition substantially as it comes from the press, and with this material I incorporate potash-containing vegetable matter, preferably ground tobacco stems and "potash manure"—singly or combined, as already explained—and also material supplying the bone phosphate of lime. These combined animal, vegetable and phosphatic matters are then treated—simultaneously—with strong sulfuric acid.

Describing the process more fully: the ammoniate, vegetable matter and bone phosphate are placed in a suitable mixer—preferably one of the usual revolving type employed in wet mixing—and well incorporated, after which the sulfuric acid is turned in and the whole mass agitated until thoroughly mixed. When the resulting chemical action has partially subsided, and the mass begins to thicken and settle, the charge is drawn off into the chamber beneath, where the product of the day's mixing is allowed to "set", usually over night. The finished material is then transferred to the "dump", or pile, where it remains until it is properly seasoned, or until the pile has lost its heat. The compound will then be in fine mechanical and merchantable condition—being light, dry and porous—requiring but little milling or screening in its final preparation for market. While the finished material may be used in 24 hours, it is desirable to allow proper time for it to "season", as it gains, thereby, usually from ½ to ¾ of one per cent. in available phosphoric acid, and also improves in condition by losing from 2 to 4 per cent. in moisture. When the proportions of the several ingredients are properly adjusted, the crude ammoniate will supply only the requisite amount of water to satisfy the reaction due to decomposition of the bone phosphate and organic matters, and give about 10% ultimate moisture in the finished article.

The compound resulting from the combination of ingredients named, and chemical action involved, is a complete fertilizer, containing all the elements essential to plant life and makes available, especially, the valuable fertilizing properties of the crude ammoniate and the described vegetable matter in much more effective form and condition than has, heretofore, been obtained by merely mixing these materials with "acid phosphate" by the dry method. I lay no claim to such mechanical mixture of separate and distinct materials with a "compound", whereby no chemical change is effected, each ingredient retaining in the mixture its original condition and properties. In my compound both the ammoniate and vegetable matter are decomposed with the bone phosphate and chemically united in a new substance, uniform throughout, which possesses the combined valuable properties of the several components, yet cannot be separated—or broken up—so that one ingredient is distinguishable from the other.

The advantages of my process over former methods, in addition to those set forth in my aforesaid patent, may be thus summed up:

First, potash is in vegetable form—as prepared by nature—hence is adapted to perfect development of plant life, and is free from injurious properties common to salts.

Second, potash is chemically united with other elements and is more effective than if employed separately, as a salt, in dry mixture.

Third, potash salts (muriate and kainite especially) containing chlorin, are injurious to certain crops, tobacco principally; whereas potash in vegetable form (tobacco stems, especially, being expressly fitted by nature for this purpose) proves an ideal food for this particular crop.

Fourth, potash salts draw moisture from damp ingredients, or from the atmosphere, and deliquesce, causing the fertilizer to "set"—becomes hard and cakes in the bags, or packs in the pile when stored in bulk. The vegetable matter not having this tendency, or property, the compound is always in good condition for drilling—an important advantage.

Fifth, potash salts—muriate and sulfate in particular—often cause injury to seed, and also "burn" vegetation. In the form of vegetable matter, potash has no caustic, or other injurious properties, and can be used freely without injury to either seed or leaf.

Sixth, the vegetable matter being chemically united with other ingredients of the compound, the potash is given up uniformly therewith—as required by the crop—whereas when used as a salt it is liable to waste, in being dissolved and washed out, before the other ingredients are sufficiently decomposed in the soil and become available.

Seventh, ingredients of compound (and especially vegetable matters) having wide range in percentages of fertilizing elements, admit of different combinations, or formulas, by which various grades of "complete" fertilizers, as herein described, are produced by one operation.

Eighth, in decomposing all the ingredients of the compound and thereby obtaining combine in the product, all the fertilizing properties of a complete fertilizer, not only is secured greater uniformity in results—both in analysis and in the field—but a large saving in cost of the finished material is effected.

Ninth, a large per cent. of potash as contained in vegetable matter is recovered or converted, which, notwithstanding its being in the most valuable form as plant food, has not, heretofore, been given commercial rating or valuation under an lytical methods as employed by the agricultural departments of the different States. The method adopted by the official agricultural chemists for the determination of potash, gives value only to the "water soluble" potash, hence the manufacturer who uses organic or vegetable material in the raw state, receives credit for only a part of the potash which the goods actually contain, although all of this important element in organic form is available to the crop; for this reason, in particular, vegetable, or organic materials carrying potash, command relatively low market values. By my method of treating potash-containing vegetable matter, this objectionable feature is eliminated, as all organic matter is decomposed by the acid and the potash contained therein being thereby converted into a sulfate, becomes "water soluble"; hence in the finished article all the potash receives credit. My invention therefore benefits both the producer and the consumer by opening the way for an increased use or consumption of valuable waste vegetable materials of the class herein described. The manufacturer, by receiving credit for all that his goods contain, can use these materials more largely, and can sell the finished article at a correspondingly reduced price.

Having thus described my invention, the following is what I claim as new therein and desire to secure by Letters Patent:

1. The process of producing a fertilizer which consists in decomposing by strong sulfuric acid, tri-calcium phosphate together with undried press-cake of nitrogenous organic matter and potash-containing vegetable matter.

2. The process of producing a fertilizer which consists in mixing with tri-calcium phosphate, undried press-cake of nitrogenous refuse, and potash-containing vegetable matter, and then decomposing the mixture by strong sulfuric acid, supplying the water for the reaction from the moisture contained in the press-cake of nitrogenous refuse.

3. The process of producing a fertilizer which consists in mixing with tri-calcium phosphate, an ammoniate containing about 40 to 50 per cent. moisture, and vegetable matter containing potash, and then decomposing the mixture with strong sulfuric acid.

4. The process of producing a fertilizer which consists in mixing the following ingredients substantially in the proportions named, to wit; about from 300 to 500 pounds finely pulverized bone phosphate of lime about from 300 to 600 pounds of vegetable matter containing potash and about from 400 to 700 pounds of a suitable ammoniate containing about 40 to 50 per cent. moisture, and from 300 to 500 pounds of strong sulfuric acid of about 66° Baumé, agitating the mass until chemical action partially subsides, then allowing composition to set.

5. The process of producing a fertilizer, which consists in mixing crude nitrogenous organic matter containing about 40 to 50 per cent. moisture, and vegetable matter containing potash, of the character herein described, with finely pulverized bone phosphate of lime, and then adding to said mixture sufficient strong sulfuric acid to decompose the entire mass, producing in the reaction soluble phosphates of lime, sulfate of lime, sulfate of ammonia, sulfate of potash and sulfurous acid gas.

The foregoing specification signed at Washington, D. C. this 26th day of August, 1908.

JOHN R. YOUNG.

In presence of two witnesses—
HERVEY S. KNIGHT,
EDWIN S. CLARKSON.